United States Patent Office

2,775,506
Patented Dec. 25, 1956

2,775,506

PRODUCTION OF ARTIFICIAL FILAMENTS, THREADS, FIBRES, BANDS, AND THE LIKE

Robert Louis Wormell, Coventry, England, assignor to Courtaulds Limited, London, England, a British company No Drawing. Application April 1, 1954,
Serial No. 420,439

Claims priority, application Great Britain May 3, 1950

15 Claims. (Cl. 18—54)

This invention relates to the production of artificial filaments, threads, fibres, bands and the like, hereinafter referred to generally as "threads," from casein of animal or vegetable origin, for example lactic or milk casein, peanut protein, soya bean protein, castor bean protein and similar fibre-forming proteins. This application is a continuation-in-part application of my application Serial No. 220,727, filed April 12, 1951, now Patent No. 2,691,568, and contains subject matter common to co-pending application Serial No. 255,912, filed November 13, 1951, now Patent No. 2,684,282.

It is known to produce such threads by extruding a solution of the protein into a setting medium, for example by extruding a solution of the protein in caustic soda into a coagulating bath containing sodium sulphate and sulphuric acid. It is the usual practice to subject the freshly-extruded threads to the action of formaldehyde, either alone or in conjunction with an acid or one or more salts, in order to harden the threads, that is to make them resistant to cold water. The threads are then usually further treated in order to render them resistant to hot water and hot aqueous solutions, such a process being known as "insolubilising."

The wet properties of artificial protein threads as produced hitherto have not, in general, been entirely satisfactory for some textile purposes. Thus, the threads usually swell appreciably in water and in dilute alkali solutions such as are used in scouring and milling, so that fabrics made from protein threads, alone or in admixture with wool, tend to be adversely affected by standard scouring and milling processes. In addition, artificial protein threads which have been dyed have poor fastness to washing, and standard scouring treatments of dyed protein threads usually reduce the depth of shade considerably.

German patent specification No. 748,450 describes a process of dyeing and printing natural or artificial protein fibers or mixtures of such fibres, wherein the fibres, either during or after the dyeing, are treated with methanol in the presence of an esterification catalyst.

The object of the present invention is to improve the wet properties of protein threads.

According to the present invention, in a process for the production of protein threads by extruding a solution of a protein into a setting medium, hardening by immersing the freshly-extruded thread so obtained in a bath containing formaldehyde and one or more of the salts sodium sulphate, magnesium sulphate and aluminum sulphate until the thread is resistant to the solvent action of cold water, and stretching the thread during the hardening treatment, the swelling susceptibility of the thread is decreased by the steps of esterifying the thread in a bath comprising methyl alcohol or ethyl alcohol together with an esterification catalyst such as sulphuric acid at a temperature between about 30° C. and about 50° C. for an esterification time of at least ½ hour and then subjecting the esterified thread to an insolubilising treatment consisting of applying to the esterified thread an aqueous solution containing cyanic ions and subsequently heating the thus-treated thread at an elevated temperature. Suitable temperatures for this heating step are from 60° C. to 70° C.

The cyanate insolubilising treatment may be effected by the process described in British patent specification No. 614,506 according to which the protein fibres are immersed in an aqueous bath containing cyanic ions, pressed or centrifuged to remove excess solution, dried, washed and dried again. It is preferred however to avoid the deposition of cyanate compounds in the thread during the heating operation as by using the process described and claimed in application, Serial No. 255,912 according to which the esterified thread is treated with an aqueous solution containing cyanic ions and excess solution is removed so as to keep on the esterified thread that amount and only that amount of cyanic ions which is the chemical equivalent of the acidic amino acid residues in the protein. The method of determining this chemical equivalent as described in the said application, Serial No. 255,912 is equally suitable for use with esterified threads. A marked improvement in wet properties can however also be obtained by using amounts of cyanic ions less than this chemical equivalent. In general, threads having satisfactory wet properties for commercial use are obtained by using from about 2 to about 4 percent of sodium cyanate based on the weight of the esterified thread. These amounts correspond to about 1.3 to 2.6 percent of —CNO ions, based on the weight of the esterified thread.

Suitable compounds giving rise to cyanic ions for use in this invention are sodium cyanate, potassium cyanate, ammonium cyanate and calcium cyanate. These salts are preferably applied to the thread in such quantities as to give 1.3 to 2.6 percent of cyanic ions based on the weight of the thread.

It is believed that the cyanate compound applied to the esterified thread reacts during the drying with the acidic amino acid residues which are always present in the thread in excess over the equivalent basic residues to liberate cyanic acid which then reacts with adjacent =NH groups to give =N—CONH₂ groups while any excess is decomposed to ammonia and carbon dioxide thus

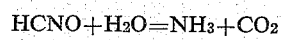

$$HCNO + H_2O = NH_3 + CO_2$$

The preferred esterification catalyst is sulphuric acid but other catalysts such as methyl sulphuric acid and ethyl sulphuric acid may be used.

The cyanate treatment solution may also contain a soft-finishing compound.

The prehardened fibres either alone or in admixture with other fibres may be knitted, woven or otherwise formed into a fabric and the fabric may then be treated in an esterification bath followed by a cyanate insolubilising treatment in accordance with the invention.

The esterification liquid containing sulphuric acid and methyl alcohol or ethyl alcohol may also contain water preferably in a proportion not exceeding 30 percent by weight based on the weight of the alcohol. Proportions of water of the order of 20 to 25 percent are particularly suitable. The use of esterification media containing water is usually more economic as compared with the use of similar media which are substantially free from water. Baths containing 75 to 80 percent of methyl alcohol or ethyl alcohol and 25 to 20 percent of water, with 160 to 240 grams per litre of sulphuric acid may be used with good results. Such esterification is preferably effected at raised temperatures, temperatures of from 35° to 50° C. being particularly suitable. Treatment times are not critical and may conveniently vary from ½ hour to 3 hours, depending on the temperature used and the concentration of the esterification bath.

The addition of a dialkyl sulphate, for example in a proportion of about 30 percent by weight based on the weight of the alcohol, assists in the esterification. The preferred dialkyl sulphate is diethyl sulphate.

It is also advantageous to pretreat the hardened protein threads immediately before the esterification step with the alcohol used in the esterification or, when a mixture of water and alcohol is used in the esterification bath, with an alcohol-water mixture having the same composition as that present in the esterification bath. This pretreatment step helps to maintain the composition of the esterification bath substantially constant particularly during prolonged operations.

The process according to the invention produces protein threads which are generally white in colour and have reduced water imbibition. The fastness to washing of threads dyed with a dispersed dye such as Azo-Geranine (Colour Index No. 31) and with chrome dyes is also improved. The threads are also stable to normal hot acid dyebaths containing acid dyes, chrome-complex acid dyes, chrome dyes, and also to normal dyebaths containing direct dyes and solubilised sulphur dyes.

The process according to the invention may include a cutting operation at any convenient stage; the staple fibres produced are particularly suitable for blending with wool in the manufacture of milled articles such as blankets, since the protein fibres are not adversely affected to any appreciable extent by the milling process.

The invention is illustrated by the following examples in which parts and percentages are by weight:

*Example 1*

A 20 percent solution of milk casein in 1 percent aqueous caustic soda solution was extruded into a coagulant bath. The resultant threads after hardening in formaldehyde were stretched 400 percent and were then hardened further by immersion for 2 hours at a temperature of 50° C. in a liquor containing, in each litre, 250 grams of aluminum sulphate, 250 grams of sodium sulphate and 10 grams of formaldehyde. The fibres after removal of excess water, washing and pressing were immersed in a methyl alcohol bath at 35° C. Surplus alcohol was squeezed out and the fibres were then esterified for one hour at a temperature of 35° C. with 20 parts by weight of a liquor consisting of 6.2 parts by volume of methyl alcohol, 2.6 parts by volume of diethyl sulphate and 1 part by volume of sulphuric acid. The esterified fibres were washed until they reacted neutral to methyl red and hydroextracted and the moist fibres were impregnated with a 2 percent aqueous solution of sodium cyanate containing 0.1 percent of a soft finish. The fibres were then squeezed to 100 percent expression (i. e. the fibres retained their own weight of solution) and were dried at 60° C.

The imbibition of the threads obtained in a 1 percent aqueous sodium carbonate solution was 45 percent as compared with 125 percent for corresponding threads which had been hardened only.

The product obtained was dyed according to standard wool dyeing technique in dyebaths containing (a) 0.65 percent of Coomassie Red PG 150 (Journal of the Society of Dyers and Colourists, 1939, page 62),
(b) 1 percent Neolan Red BRE (Journal of the Society of Dryers and Colourists, 1943, page 123),
(c) 1 percent Alizarine Red AS, using as a control a thread prepared as described in Example 1 but excluding only the esterification step. In each case the thread prepared as described in the example was substantially unaffected by the dyeing treatment whereas the dyed control threads were hard and rather brittle.

Samples of the thread of Example 1 were also compared in the same way with dyebaths containing:

Direct dyes:
   0.3 percent Chrysophenine G305 (C. I. 365),
   0.5 percent Durazol Blue 2GN 200 (Journal of the Society of Dyers and Colourists, 1943, page 124)
   0.65 percent Chlorazol Dark Green PL150 (C. I. 583)
Solubilised Sulphur dye:
   3 percent Thionol Navy Blue RMS.

The dyed threads prepared according to Example 1 were appreciably superior to the dyed control threads.

*Example 2*

Casein fibres which had been initially hardened as described in Example 1 were soaked in methyl alcohol at a temperature of 40° C. and the excess alcohol removed by squeezing. The fibres were esterified for 1 hour at 35° C. with a liquor consisting of methyl alcohol containing in each litre 180 grams of sulphuric acid. The esterified fibres were washed free from acid and hydroextracted. The moist fibres were impregnated with a 2 percent solution of sodium cyanate containing 0.1 percent of a soft finish and the excess liquor squeezed out to 150 percent expression so that the thread retained that amount of cyanate (3 percent) which is the chemical equivalent of its acidic amino acid residues. The fibres were heated at 70° C. for 10 minutes, washed in water and finally dried.

The imbibition of the product was 70 percent.

The dyeing properties of the product were similar to those of the product of Example 1.

*Example 3*

Threads, extruded, hardened and stretched as described in Example 1, were hardened further for 3 hours in a bath at 45° C. containing in each litre 550 grams of aluminum sulphate and 20 grams of formaldehyde. The threads were washed free from excess liquor and were then esterified by immersion for 45 minutes in methyl alcohol containing 350 grams per litre of sulphuric acid, this liquor being at a temperature of 35° C. The threads were washed until they were free from acid and then immersed for 20 minutes in a 4 percent aqueous sodium cyanate solution. Excess solution was removed from the threads by squeezing to 100 percent expression and the threads were dried at 65° C.

What I claim is:

1. In a process for the production of artificial threads from proteins by extruding a solution of a protein selected from the class consisting of milk casein, peanut protein, soya bean protein, and castor bean protein into a setting medium, and hardening by immersing the freshly extruded thread so obtained in a bath containing formaldehyde and a metal salt chosen from the class consisting of sodium sulphate, magnesium sulphate, aluminium sulphate and mixtures of said salts, until the thread is resistant to the solvent action of cold water, the method of decreasing the swelling susceptibility of the thread by the steps of esterifying the thread in a bath comprising an alcohol chosen from the group consisting of methyl alcohol and ethyl alcohol together with an esterification catalyst, at a temperature between about 30° and about 50° C. for an esterification time of at least ½ hour and then subjecting the esterified thread to an insolubilising treatment consisting of applying to the esterified thread an aqueous solution containing cyanic ions and then heating the thus-treated thread at elevated temperature.

2. A process as claimed in claim 1 wherein the esterification catalyst used is sulphuric acid.

3. A process as claimed in claim 1 wherein the esterification bath contains water in a proportion not exceeding 30 percent by weight based on the weight of the alcohol.

4. A process as claimed in claim 3 wherein the esterification bath contains 20 to 25 percent of water based on the weight of the alcohol.

5. A process as claimed in claim 1 and including the step of pretreating the hardened threads immediately before the esterification step with the alcohols used in the esterification step.

6. In a process for the production of artificial threads from proteins by extruding a solution of a protein selected from the class consisting of milk casein, peanut protein, soya bean protein, and castor bean protein into a setting medium, and hardening by immersing the freshly extruded thread so obtained in a bath containing formaldehyde and a metal salt chosen from the class consisting of sodium sulphate, magnesium sulphate, aluminium sulphate and mixtures of said salts, until the thread is resistant to the solvent action of cold water, the method of decreasing the swelling susceptibility of the thread by the steps of esterifying the thread in a bath comprising an alcohol chosen from the group consisting of methyl alcohol and ethyl alcohol together with an esterification catalyst, at a temperature between about 30° and about 50° C. for an esterification time of at least ½ hour and then subjecting the esterified thread to an insolubilising treatment consisting of treating the esterified thread with an aqueous solution containing cyanic ions, and moving excess solution, keeping on the esterified thread after said removal step, that amount and substantially only that amount of cyanic ions which is the chemical equivalent of the acidic amino acid residues in the protein, and drying the thus-treated thread at an elevated temperature.

7. A process as claimed in claim 6 wherein the esterification catalyst used is sulphuric acid.

8. A process as claimed in claim 6 wherein the esterification bath contains water in a proportion not exceeding 30 percent by weight of the alcohol.

9. A process as claimed in claim 8 wherein the esterification bath contains 20 to 25 percent of water based on the weight of the alcohol.

10. A process as claimed in claim 6 and including the step of pretreating the hardened threads immediately before the esterification step with the alcohol used in the esterification step.

11. In a process for the production of artificial threads from proteins by extruding a solution of a protein selected from the class consisting of milk casein, peanut protein, soya bean protein, and castor bean protein into a setting medium, and hardening by immersing the freshly extruded thread so obtained in a bath containing formaldehyde and a metal salt chosen from the class consisting of sodium sulphate, magnesium sulphate, aluminium sulphate and mixtures of said salts, until the thread is resistant to the solvent action of cold water, the method of decreasing the swelling susceptibility of the thread by the steps of esterifying the thread in a bath comprising an alcohol chosen from the group consisting of methyl alcohol and ethyl alcohol together with an esterification catalyst, at a temperature between about 30° and about 50° C. for an esterification time of at least ½ hour and then subjecting the esterified thread to an insolubilising treatment consisting of treating the esterified thread with an aqueous solution containing cyanic ions and removing excess solution, keeping on the esterified thread from 1.3 to 2.6 percent of cyanic ions, based on the weight of the esterified thread, and drying the thus-treated thread at an elevated temperature.

12. A process as claimed in claim 11 wherein the esterification catalyst used is sulphuric acid.

13. A process as claimed in claim 11 wherein the esterification bath contains water in a proportion not exceeding 30 percent by weight based on the weight of the alcohol.

14. A process as claimed in claim 13 wherein the esterification bath contains 20 to 25 percent of water based on the weight of the alcohol.

15. A process as claimed in claim 11 and including the step of pretreating the hardened threads immediately before the esterification step with the alcohol used in the esterification step.

References Cited in the file of this patent

UNITED STATES PATENTS

| 2,240,388 | Calva | Apr. 29, 1941 |

FOREIGN PATENTS

| 483,731 | Great Britain | Apr. 21, 1938 |
| 495,885 | Great Britain | Nov. 22, 1938 |
| 614,506 | Great Britain | Dec. 16, 1948 |

OTHER REFERENCES

Textile Research Journal, April 1949, pp. 202–211.